(12) United States Patent
Bock et al.

(10) Patent No.: US 7,699,036 B2
(45) Date of Patent: Apr. 20, 2010

(54) ASSEMBLY, COMPRISING AN EXHAUST GAS TURBOCHARGER, AN INTERCOOLER AND A CHARGE-AIR LINE

(75) Inventors: Stefan Bock, Grossostheim (DE); Roland Schray, Ingersheim (DE); Thomas Rösch, Linsengericht-Grossenhausen (DE); Andreas Seyler, Gründau (DE)

(73) Assignees: ElringKlinger AG, Dettimgen (DE); Veritas AG, Gelmhaugen (DE)

( * ) Notice: Subject to any disclaimer, the term of this patent is extended or adjusted under 35 U.S.C. 154(b) by 0 days.

(21) Appl. No.: 12/070,972

(22) Filed: Feb. 22, 2008

(65) Prior Publication Data
US 2008/0236163 A1 Oct. 2, 2008

Related U.S. Application Data

(63) Continuation of application No. PCT/EP2007/009870, filed on Nov. 15, 2007.

(30) Foreign Application Priority Data
Nov. 17, 2006 (DE) .................. 10 2006 054 270

(51) Int. Cl.
*F02M 35/10* (2006.01)
*F02B 33/00* (2006.01)

(52) U.S. Cl. .................. 123/184.61; 123/559.1; 60/605.1; 60/559

(58) Field of Classification Search ............ 123/184.55, 123/184.56, 184.61, 559.1, 563; 60/559, 60/605.1
See application file for complete search history.

(56) References Cited

U.S. PATENT DOCUMENTS

| 4,565,166 | A | * | 1/1986 | Takeda | 123/184.55 |
|---|---|---|---|---|---|
| 4,889,081 | A | * | 12/1989 | Ozaki | 123/184.53 |
| 4,932,490 | A | * | 6/1990 | Dewey | 180/68.3 |
| 5,447,128 | A | * | 9/1995 | Spinelli | 123/184.21 |
| 5,769,045 | A | * | 6/1998 | Edwards et al. | 123/184.61 |
| 5,791,144 | A | * | 8/1998 | Thompson | 60/599 |
| 5,806,480 | A | * | 9/1998 | Maeda et al. | 123/184.57 |
| 6,013,700 | A | | 1/2000 | Asano et al. | 523/335 |

(Continued)

FOREIGN PATENT DOCUMENTS

DE 201 02 973 U1 8/2001

(Continued)

*Primary Examiner*—Hai H Huynh

(57) ABSTRACT

To provide an assembly, comprising an exhaust gas turbocharger and an intercooler for an internal combustion engine and a hot-side charge-air line connecting the exhaust gas turbocharger to a charge-air inlet of the intercooler, which assembly allows the movements to be equalised between the exhaust gas turbocharger and the intercooler and is simple to produce and assemble, it is proposed that the hot-side charge-air line comprises a one-piece plastics material tube which is formed from a material containing polytetrafluoroethylene and/or modified polytetrafluoroethylene and has at least one flexible zone.

24 Claims, 13 Drawing Sheets

U.S. PATENT DOCUMENTS

| | | | |
|---|---|---|---|
| 6,227,159 B1 * | 5/2001 | Ropertz | 123/184.21 |
| 6,247,460 B1 * | 6/2001 | Lindberg et al. | 123/563 |
| 6,408,810 B1 * | 6/2002 | Leipelt et al. | 123/184.55 |
| 6,837,204 B1 * | 1/2005 | Stuart | 123/184.55 |
| 7,100,584 B1 * | 9/2006 | Bruestle et al. | 123/563 |
| 7,249,652 B2 * | 7/2007 | Wolf | 181/248 |
| 7,296,562 B2 * | 11/2007 | Withrow et al. | 123/559.1 |
| 2001/0004887 A1 * | 6/2001 | Hwang et al. | 123/184.57 |
| 2002/0179034 A1 * | 12/2002 | Sisken | 123/198 A |
| 2006/0182914 A1 | 8/2006 | Yasumatsu et al. | 428/36.8 |
| 2008/0184704 A1 * | 8/2008 | Bock et al. | 60/599 |

FOREIGN PATENT DOCUMENTS

| | | |
|---|---|---|
| DE | 697 26 864 T2 | 10/2004 |
| DE | 20 2004 018 301 U1 | 9/2005 |
| EP | 0 041 687 A1 | 12/1981 |
| EP | 0 931 798 A1 | 7/1999 |
| EP | 1 396 670 A1 | 3/2004 |
| JP | 2005-214375 | 8/2005 |
| WO | WO 99/56049 A | 11/1999 |

* cited by examiner

ASSEMBLY, COMPRISING AN EXHAUST GAS TURBOCHARGER, AN INTERCOOLER AND A CHARGE-AIR LINE

RELATED APPLICATION

This application is a continuation application of PCT/EP2007/009870 filed Nov. 15, 2007, the entire specification of which is incorporated herein by reference.

FIELD OF THE DISCLOSURE

The present invention relates to an assembly comprising an exhaust gas turbocharger and an intercooler for an internal combustion engine and a hot-side charge-air line connecting the exhaust gas turbocharger to a charge-air inlet of the intercooler.

Since the exhaust gas turbocharger, on the one hand, and the charge-air inlet of the intercooler on the other hand move relative to one another during operation of the internal combustion engine, the hot-side charge-air line must be flexible enough to be able to equalise the relative movements of its end on the turbocharger side and its end on the intercooler side.

BACKGROUND

Known assemblies of the aforementioned type are thus formed from metal tubes and flexible hoses of resilient material. However, charge-air lines composed in this way are complex to produce and assemble.

Plastics material tubes, as used for the cold-side charge-air line between a charge-air outlet of the intercooler and a charge-air inlet of the internal combustion engine do not withstand the high charge-air temperatures and charge-air pressures in the hot-side charge-air line.

SUMMARY OF THE INVENTION

The object of the present invention is to provide an assembly of the type mentioned at the outset which allows the movement to be equalised between the exhaust gas turbocharger and the intercooler and which is simple to produce and assemble.

This object is achieved according to the invention with an assembly having the features of the preamble of claim 1, in that the hot-side charge-air line comprises a one-piece plastics material tube which is formed from a material containing polytetrafluoroethylene or a modified polytetrafluoroethylene and which has at least one flexible zone.

In this respect, the term a "modified polytetrafluoroethylene" is understood as meaning a polytetrafluoroethylene-like substance in which the molecular structure of the polytetrafluoroethylene (PTFE) has been chemically modified in that, in addition to tetrafluoroethylene, another likewise perfluorinated monomer is incorporated into the molecular chain so that some of the fluorine atoms of the PTFE have been replaced by substituents.

The chemical composition and preparation of "modified PTFE" is described, for example in EP 0 041 687 A1, EP 0 931 798 A1 or in U.S. Pat. No. 6,013,700.

The charge-air line formed as a one-piece plastics material tube from a material containing PTFE or modified PTFE is simple to produce, handle and assemble and has a high thermal resistance as well as a high dynamic mechanical strength, such that surprisingly, a charge-air line of this type is also able to cope with the high operating temperatures and operating pressures in a hot-side charge-air line.

The ends of the plastics material tube may be deformed plastically and/or elastically in order to connect said tube directly and in a fluid-tight manner to the adjoining units, i.e. to the exhaust gas turbocharger and the intercooler.

The material containing PTFE or modified PTFE of the one-piece plastics material tube is suitable for temperatures as low as −50° C. and for temperatures as high as approximately 300° C. and may be subjected to a high dynamic load. The resulting charge-air line has very good fatigue strength under reversed bending stresses and a high acoustic internal damping as well as a universal chemical resistance to blow-by gases and typical engine media, for example oils, greases, brake fluid and road salt.

Since the charge-air line according to the invention is formed from a one-piece plastics material tube, it may be produced simply, in a process-safe and cost-effective manner and may be handled easily during assembly.

To provide the desirable moulding flexibility of the flexible zone of the plastics material tube, it may be provided in particular that the flexible zone comprises a corrugated region, preferably a bellows arrangement.

The flexible zone is preferably arranged closer to the end on the intercooler side of the plastics material tube than to the end on the turbocharger side of the plastics material tube where the thermal stress on the charge-air line is greatest. The entire length of the plastics material tube of the assembly according to the invention may be flexible.

Alternatively, it may also be provided that the plastics material tube has at least one rigid zone, in addition to the at least one flexible zone.

The rigid, dimensionally stable zone of the plastics material tube may have at least one curved portion.

The plastics material tube used according to the invention as a charge-air line may basically be produced in any manner, for example in an injection moulding process.

However, the plastics material tube is preferably blow moulded.

The higher the selected forming temperature, the lower the memory effect of the moulded plastics material tube, i.e. the reforming tendency of the moulded plastics material tube when heated.

It is therefore particularly favourable if the plastics material tube is moulded at a temperature above the crystallite melting temperature of the starting material.

The plastics material tube may be formed, for example from pure polytetrafluoroethylene and/or modified polytetrafluoroethylene.

Alternatively, it may also be provided that the plastics material tube is formed from a polytetrafluoroethylene compound and/or a modified polytetrafluoroethylene compound, i.e. from a mixture of polytetrafluoroethylene or modified polytetrafluoroethylene and at least one organic or inorganic filler.

To render the plastics material tube black, it may be provided in particular that the polytetrafluoroethylene compound or the modified polytetrafluoroethylene compound contains a black pigment, preferably carbon black.

In order to form the hot-side charge-air line, the plastics material tube could basically be combined with another element conveying charge-air, for example with a metal tube.

However, in order to keep the number of components required for the inventive assembly as low as possible and thus to keep the production and assembly costs as low as possible, it is advantageous if the hot-side charge-air line does not comprise any other charge-air-conveying element, apart from the one-piece plastics material tube.

To increase the compressive strength and the mechanical stability of the charge-air line, provision may be made for at least one reinforcement ring to be arranged on the plastics material tube.

It is preferably provided that at least one reinforcement ring is arranged on the outside of the plastics material tube to prevent an undesirable expansion of the plastics material tube under the charge-air pressure to which the inside of the plastics material tube is subjected.

It is particularly effective if at least one reinforcement ring is arranged in the flexible zone of the plastics material tube.

In order to be able to easily handle the plastics material tube with the reinforcement ring arranged thereon as a unit, it is favourable for at least one reinforcement ring to be held in positive manner on the plastics material tube.

At least one reinforcement ring may be configured in one piece.

A one-piece reinforcement ring of this type is preferably joined with the plastics material tube as said tube is being moulded.

As an alternative, or additionally, it may also be provided that at least one reinforcement ring is configured in multiple parts.

Multipart reinforcement rings may be provided with, for example snap fits and applied subsequently to the ready moulded plastics material tube.

At least one reinforcement ring may comprise a metallic material, in particular a steel material and may preferably be completely formed of the metallic material.

Alternatively, it may also be provided that at least one reinforcement ring comprises a plastics material and is preferably formed completely of the plastics material.

Alternatively or additionally, it may also be provided that at least one reinforcement ring is formed of a fibrous material.

This fibrous material may comprise in particular organic, mineral and/or metallic fibres.

The at least one reinforcement ring is preferably braided, woven and/or spun from the fibrous material.

To be able to fix the charge-air line in a desired position, it is advantageous if at least one reinforcement ring is provided with an attachment element to secure the plastics material tube to an attachment point located outside the charge-air line.

An attachment point of this type may be arranged, for example, on a part of the bodywork or on a part of the internal combustion engine of a vehicle in which the assembly according to the invention is arranged.

The attachment element may comprise in particular a snap-fit element, a clamping element, a locking element, a threaded pin and/or a nut.

In order to be able to arrange at least one reinforcement ring on a portion of the plastics material tube having a non-rotationally symmetrical cross section, in particular having an oval cross section, it may be provided that at least one reinforcement ring has a non-rotationally symmetrical basic body, in particular an oval basic body.

The plastics material tube of the assembly according to the invention is preferably thermally stable at an operating temperature of at least 200° C., in particular at least 250° C.

Furthermore, it is advantageous if the plastics material tube of the assembly according to the invention is mechanically stable at an internal operating pressure of at least 2 bar, preferably at least 2.5 bar.

Further features and advantages of the invention are the subject of the following description and drawings of embodiments.

BRIEF DESCRIPTION OF THE DRAWINGS

Identical or functionally equivalent elements are designated by the same reference numerals in all the figures.

DETAILED DESCRIPTION OF THE INVENTION

Figure 1:
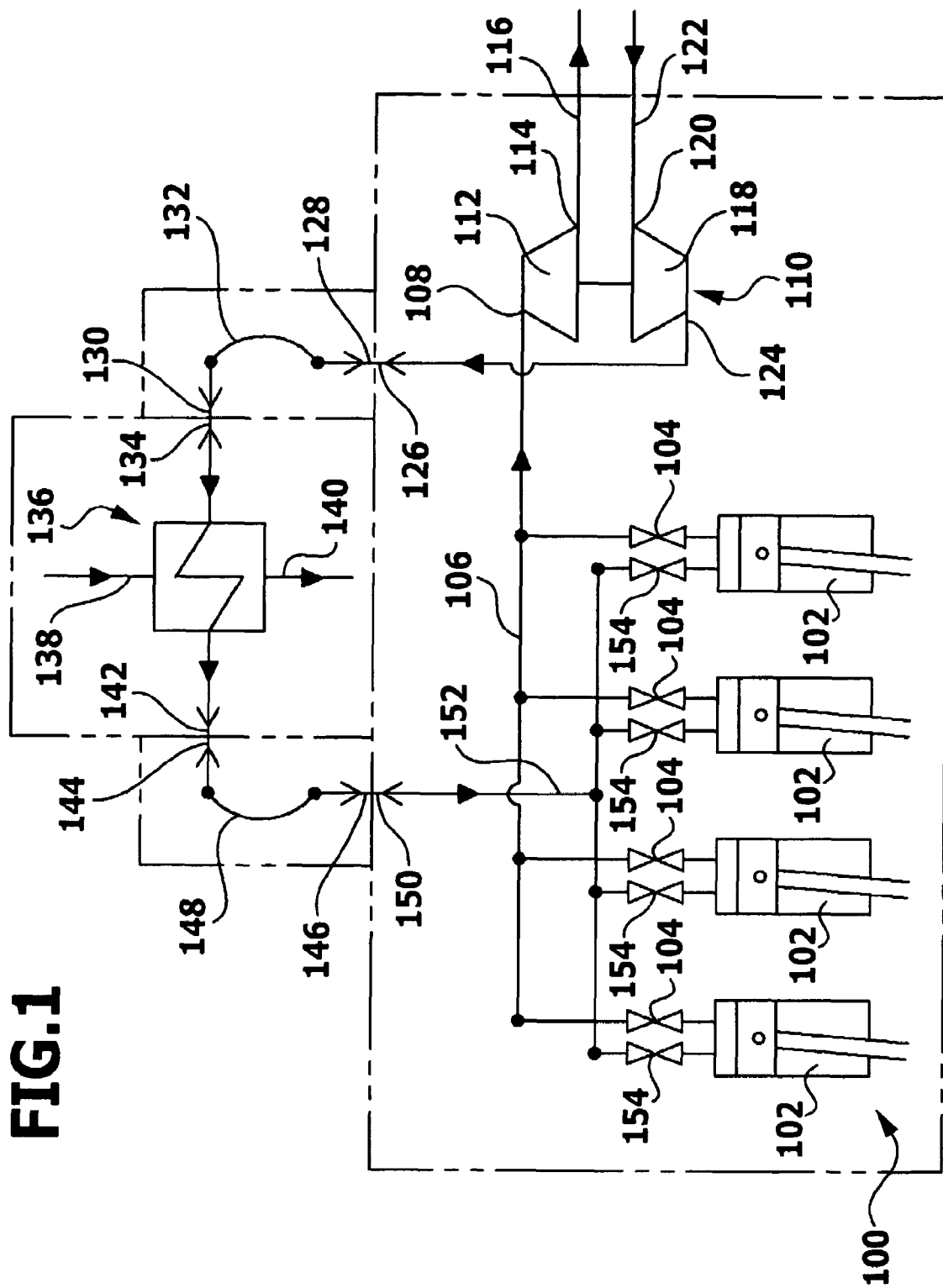
FIG. 1 shows a schematic block diagram of an internal combustion engine with exhaust gas turbocharger and intercooler.

An internal combustion engine designated overall by 100 in FIG. 1 comprises a plurality of cylinders, for example four cylinders 102, each of which is connected by an exhaust valve 104 to an exhaust gas duct 106 which leads to an exhaust gas inlet 108 of an exhaust gas turbocharger 110. The exhaust gas coming from the internal combustion engine 100 drives a thrust wheel 112 on the exhaust gas side and then leaves the exhaust gas turbocharger 110 by way of an exhaust gas outlet 114 to which an exhaust gas line 116 is connected.

The thrust wheel 112 on the exhaust gas side drives a thrust wheel 118 on the charge-air side which compresses and accelerates air entering by way of an air inlet 120 from an intake air line 122 into the charge-air side of the exhaust gas turbocharger 110.

The compressed charge-air passes through an air outlet duct 124 to a charge-air outlet 126, provided with a rapid coupling connection, of the exhaust gas turbocharger 110.

The charge-air outlet 126 is connected to a charge-air inlet 134, provided with a rapid coupling connection, of an intercooler 136 by a hot-side charge-air line 132 provided at both ends in each case with a rapid coupling connection 128, 130.

In the hot-side charge-air line 132, the charge-air has a pressure in the region of, for example, approximately 2.5 bar to approximately 3 bar and a temperature in the region of approximately 200° C. to approximately 250° C.

The intercooler 136 is a heat exchanger in which the charge-air is cooled by cooling air coming from a radiator of the vehicle.

This cooling air enters the cooling air side of the intercooler 136 through a cooling air inlet 138, absorbs heat from the charge-air and issues out of the intercooler 136 again through a cooling air outlet 140.

The charge-air which has been cooled to a temperature of, for example, approximately 145° C. and has a pressure of, for example, approximately 1.5 bar leaves the charge-air side of the intercooler 136 through a charge-air outlet 142 which is provided with a rapid coupling connection and to which a cold-side charge-air line 148 is connected which is provided at both ends in each case with a rapid coupling connection 144, 146 and which connects the intercooler 136 to a charge-air inlet 150 of the internal combustion engine 100, which charge-air inlet 150 is likewise connected to a rapid coupling connection.

Leading from the charge-air inlet 150 of the internal combustion engine 100 is a branching air feed duct 152 to intake valves 154 of the cylinders 102 of the internal combustion engine 100.

The intercooler 136 is connected to the bodywork of the motor vehicle, whereas the internal combustion engine 100 and the exhaust gas turbocharger 110 arranged thereon are mounted in a manner uncoupled in terms of vibration from the bodywork.

The charge-air outlet 126 of the exhaust gas turbocharger 110, on the one hand, and the charge-air inlet 134 of the intercooler 136, on the other hand, therefore move relative to one another during operation of the internal combustion engine 100, which is why the hot-side charge-air line 132 must be flexible enough to be able to equalise the relative movements of its end on the turbocharger side and its end on the intercooler side.

The exhaust gas turbocharger 110, the intercooler 136 and the hot-side charge-air line 132 connecting the exhaust gas turbocharger 110 to the charge-air inlet 134 of the intercooler 136 thus form an assembly 156 which is able to vibrate.

Figure 2:
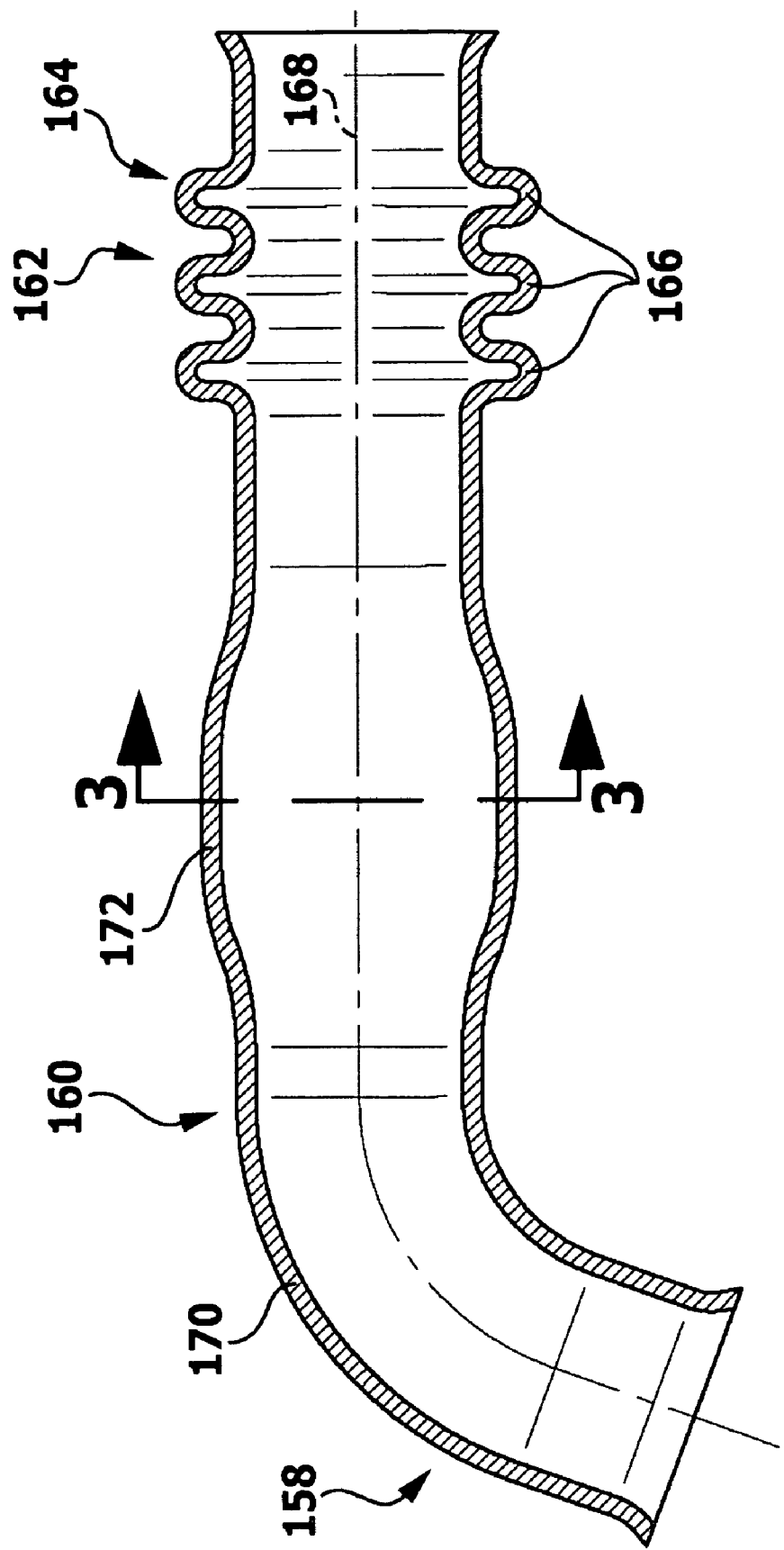
FIG. 2 shows a schematic longitudinal section through a plastics material tube which forms a hot-side charge-air line connecting the exhaust gas turbocharger to a charge-air inlet of the intercooler.
Figure 3:
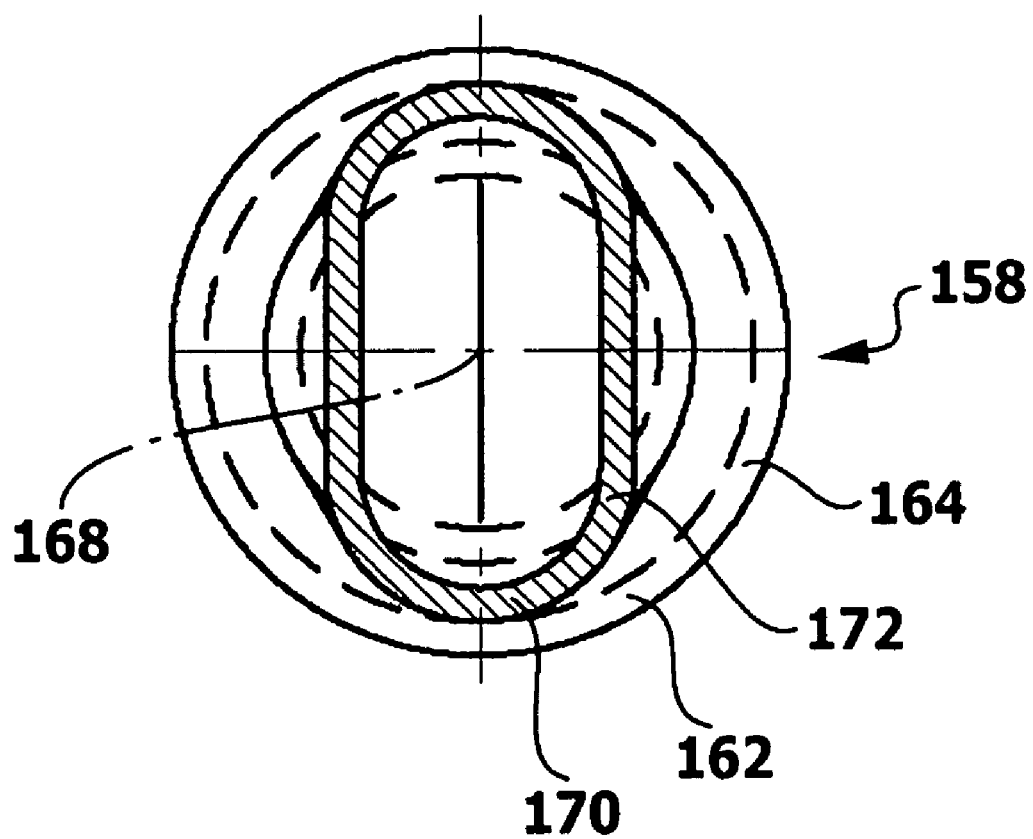
FIG. 3 shows a schematic cross section through the plastics material tube of FIG. 2 along line 3-3 in FIG. 2.

The hot-side charge-air line 132 is formed by a one-piece plastics material tube 158 which is shown in detail in FIGS. 2 and 3.

The plastics material tube 158 has a rigid zone 160 facing the exhaust gas turbocharger 110 and a flexible zone 162 facing the intercooler 136.

The flexible zone 162 comprises a bellows arrangement 164 with a plurality of annular folds, for example three annular folds 166, which allow the flexible zone 162 to extend or compress along the longitudinal axis 168 of the tube and also allow said longitudinal axis 168 of the tube to tilt in the region of the flexible zone 162.

The rigid zone 160 of the plastics material tube 158 is, on the other hand, substantially dimensionally stable.

The rigid zone 160 may have a curved portion 170.

Furthermore, the rigid zone 160 may have a portion 172 arranged, for example, between the curved portion 170 and the flexible zone 162, with an oval cross section (see FIG. 3).

The plastics material tube 158 is substantially rotationally symmetrical with respect to the longitudinal axis 168 of the tube outside the portion 172 with an oval cross section and the curved portion 170.

The plastics material tube 158 is formed in one piece from a material which contains PTFE or modified PTFE and is mechanically stable under the operating pressures prevailing in the hot-side charge-air line 132 of, for example, approximately 2.5 bar to approximately 3 bar and is thermally stable at the operating temperatures prevailing in the hot-side charge-air line 132 of approximately 200° C. to approximately 250° C.

The plastics material tube 158 is preferably formed from a PTFE compound or from a modified PTFE compound.

This PTFE compound or modified PTFE compound may contain a black pigment, preferably carbon black, in a quantity of up to 10% by weight to render the plastics material tube 158 black.

Both ends of the plastics material tube 158 are provided with a rapid coupling connection (not shown).

Figure 4:
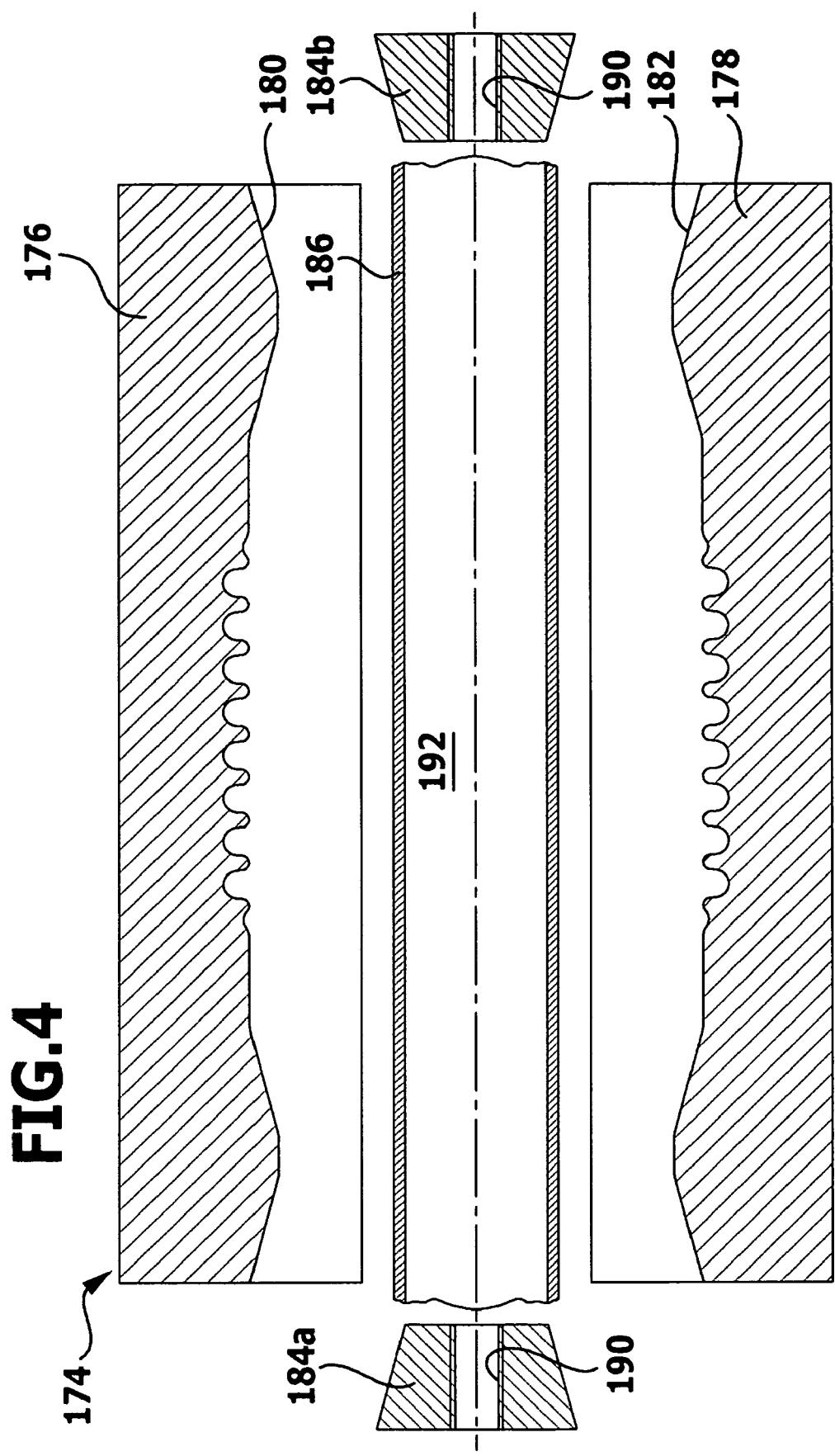
FIG. 4 shows a schematic longitudinal section through a two-part blow mould and a plastics material hose, inserted into the blow mould, prior to a blow moulding process, the blow mould being open.
Figure 5:
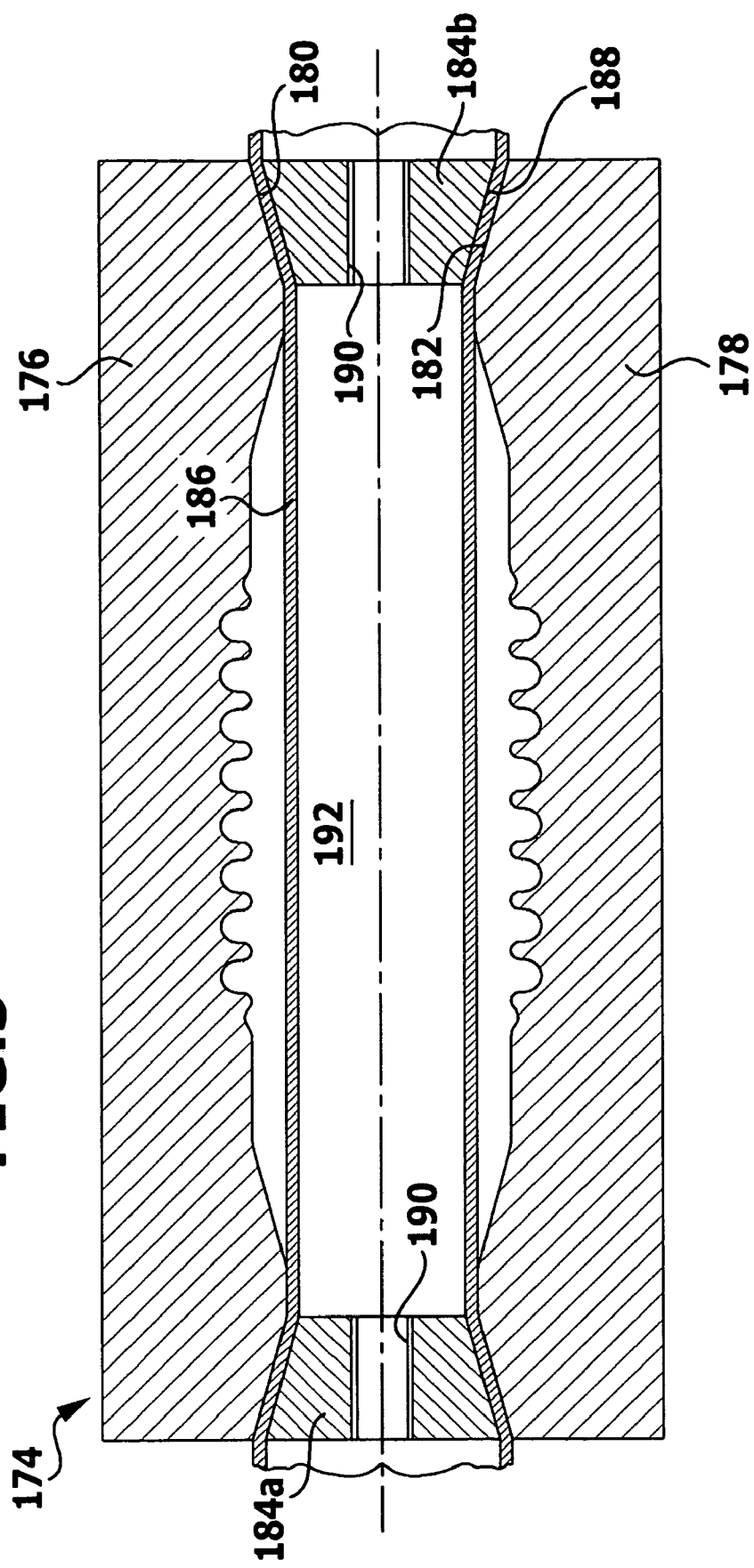
FIG. 5 shows a schematic longitudinal section through the blow mould of FIG. 4 with the inserted plastics material hose prior to a blow moulding process, the blow mould being closed.
Figure 6:
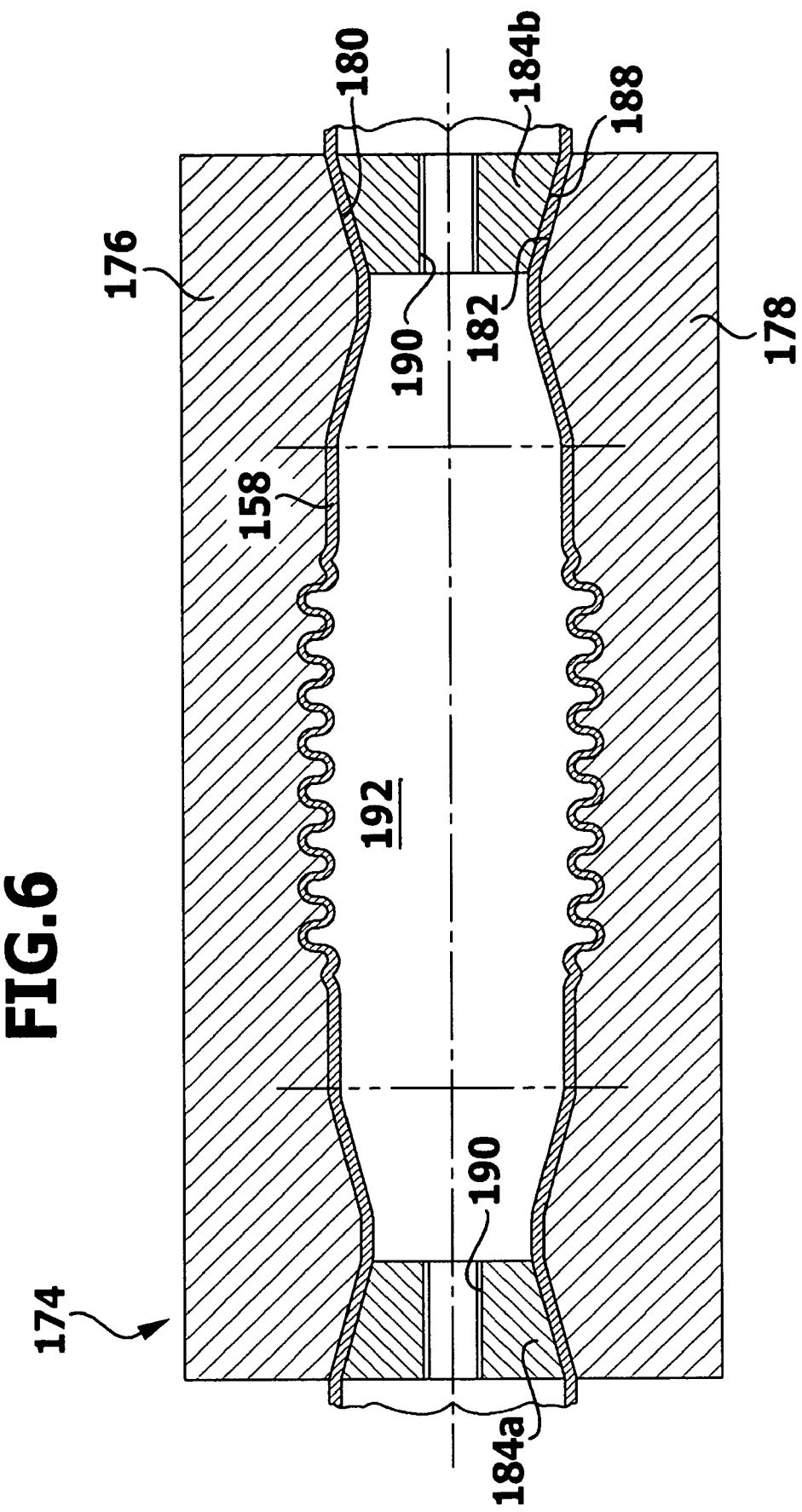
FIG. 6 shows a schematic longitudinal section through the blow mould of FIGS. 4 and 5 with the moulded plastics material tube after completion of the blow moulding process.

The plastics material tube 158 is preferably produced by a blow moulding process which is described in the following with reference to FIGS. 4 to 6.

For the blow moulding process, a multipart blow mould 174 is used which comprises an upper part 176 and a lower part 178, the mutually facing insides 180, 182 of which are configured corresponding to the desired outer contour of the plastics material tube 158, and also comprises two end-face connection pieces 184a, 184b.

Upon opening the blow mould 174 (see FIG. 4), a hose 186 consisting of the starting material containing PTFE or modified PTFE is introduced between the upper part 176 and the lower part 178 of the blow mould 174.

The blow mould 174 is then closed (see FIG. 5), the two ends of the hose 186 being pulled over a respective connection piece 184a, 184b and being clamped between the outside 188 of a respective connection piece 184a, 184b on the one hand and the inside 180 and 182 respectively of the upper part 176 and the lower part 178 respectively of the blow mould 174 on the other hand.

The blow mould 174 is then heated to a blowing temperature in the region of approximately 250° C. to approximately 400° C. by a heating device (not shown).

The higher the selected blowing temperature, the lower the memory effect of the moulded plastics material tube 158, i.e. the reforming tendency of the moulded plastics material tube 158 when heated.

It is particularly favourable if the blow moulding is carried out at a temperature above the crystallite melting temperature of the starting material of the hose 186.

When pure PTFE is used as the starting material, the crystallite melting temperature is approximately 327° C.

After reaching the desired blowing temperature, air or an inert gas is fed into the interior 192 of the hose 186 under a blowing pressure of, for example approximately 6 bar to approximately 50 bar through access ducts 190 in the connection pieces 184a, 184b.

This charging of the interior 192 of the hose 186 with the elevated blowing pressure inflates the wall of the hose 186 and it is applied against the insides 180, 182 of the upper part 176 and the lower part 178 respectively of the blow mould 174 (see FIG. 6), so that the desired contour of the plastics material tube 158 is produced.

The elevated blowing pressure in the interior 192 of the hose 186 or of the moulded plastics material tube 158 is maintained for a blowing period ranging from a few seconds to a few minutes.

The blow mould 174 is then cooled down to a temperature for removal from the mould in the region of approximately 100° C. to approximately 250° C. by disconnecting the heating device and optionally by an additional cooling operation.

After reaching the desired temperature for removal from the mould, the multipart blow mould 174 is opened and the moulded plastics material tube 158 is removed.

When the rapid coupling connections have been formed on the ends of the plastics material tube 158, said tube 158 may be used as a hot-side charge-air line 132 in the assembly 156.

Figure 7:
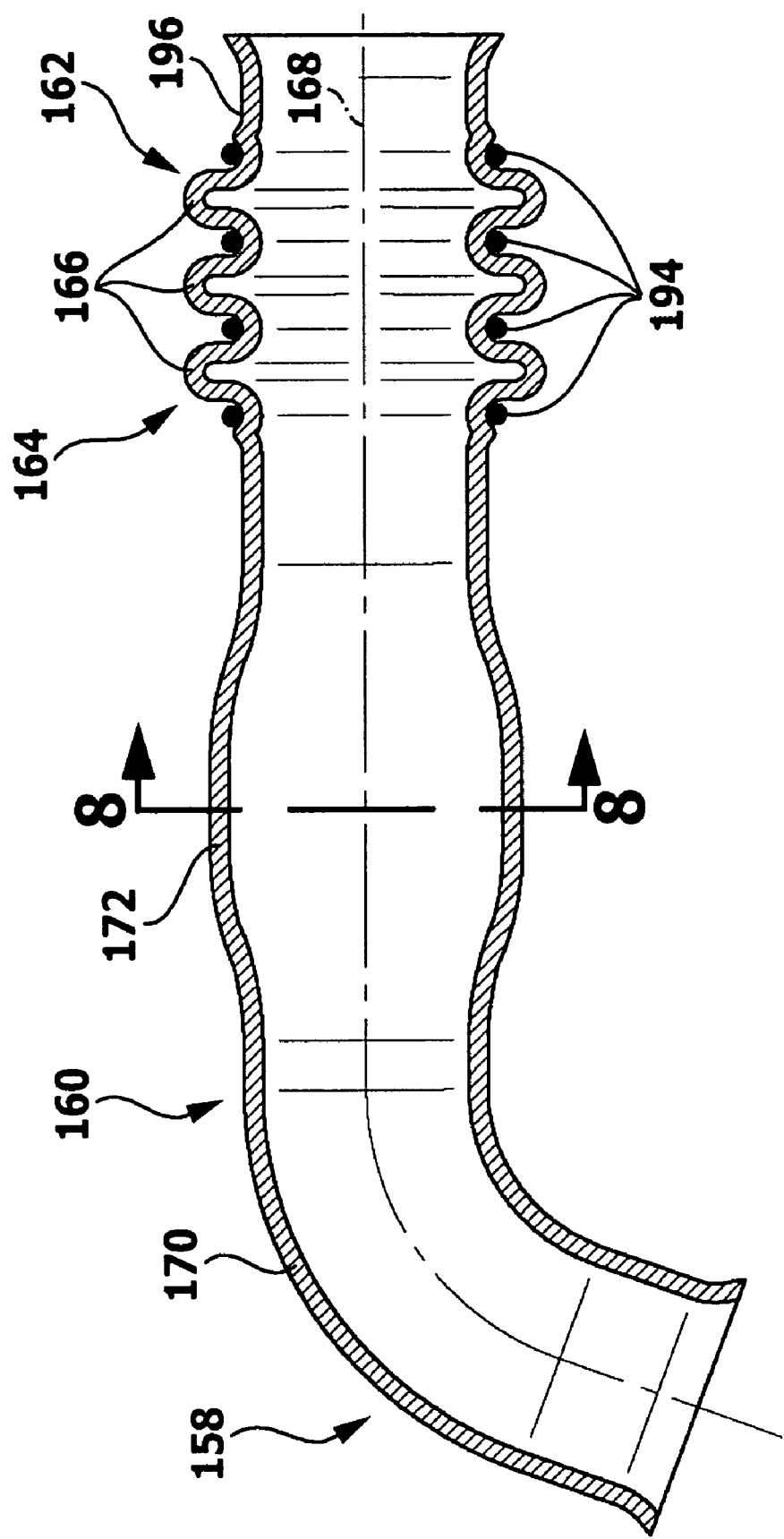
FIG. 7 shows a schematic longitudinal section through a second embodiment of a plastics material tube which forms the hot-side charge-air line and is provided with reinforcement rings.
Figure 8:
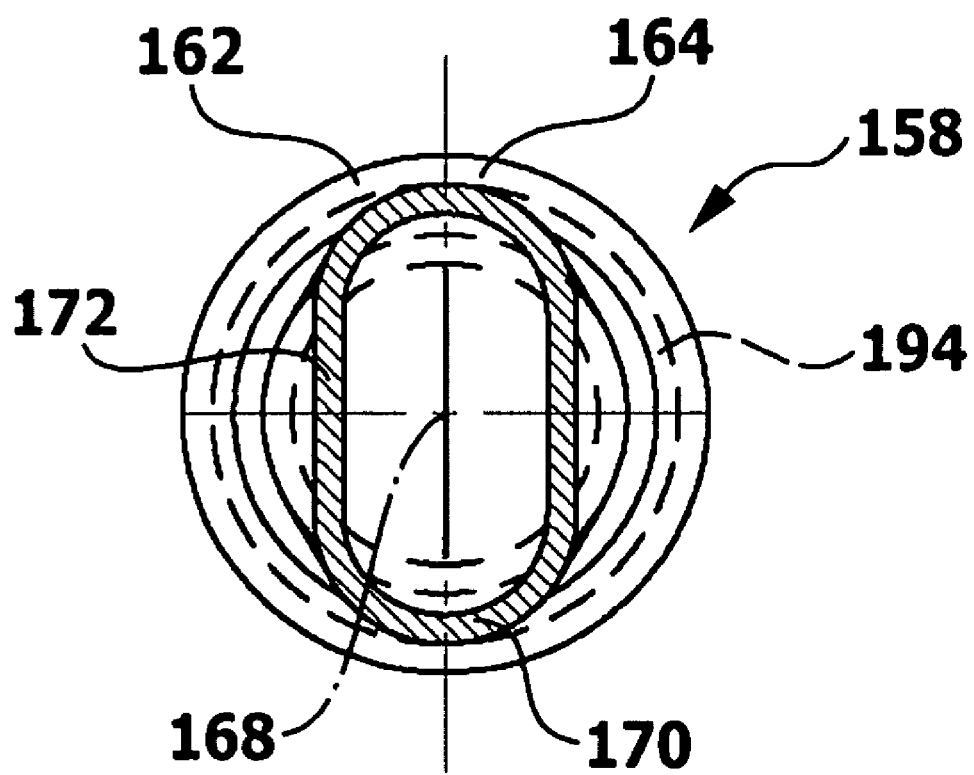
FIG. 8 shows a schematic cross section through the plastics material tube of FIG. 7 along line 8-8 in FIG. 7.

A second embodiment, shown in FIGS. 7 and 8, of a one-piece plastics material tube 158 serving as a hot-side charge-air line 132 differs from the first embodiment shown in FIGS. 2 and 3 in that, to increase the compressive strength and the mechanical stability, the plastics material tube 158 is provided with a plurality of reinforcement rings, for example four reinforcement rings 194, in the region of the flexible zone 162, which reinforcement rings 194 rest against the outside 196 of the plastics material tube 158 from the outside, in particular in the region between two folds 166 in each case.

These reinforcement rings 194 may be formed from a metallic material, for example a steel material, or from a plastics material which is sufficiently thermally and mechanically resistant.

Alternatively or additionally, it may also be provided in this respect that at least one reinforcement ring 194 is formed as a textile reinforcement ring, produced from a fibrous material.

This fibrous material may comprise organic, mineral and/or metallic fibres. The at least one reinforcement ring 194 may be braided, woven or spun from a fibrous material of this type.

The reinforcement rings 194 may be configured as a single piece or with multiple parts.

Multiple-part reinforcement rings 194 may be provided with, for example snap fits and applied subsequently to the ready moulded plastics material tube 158.

Figure 9:
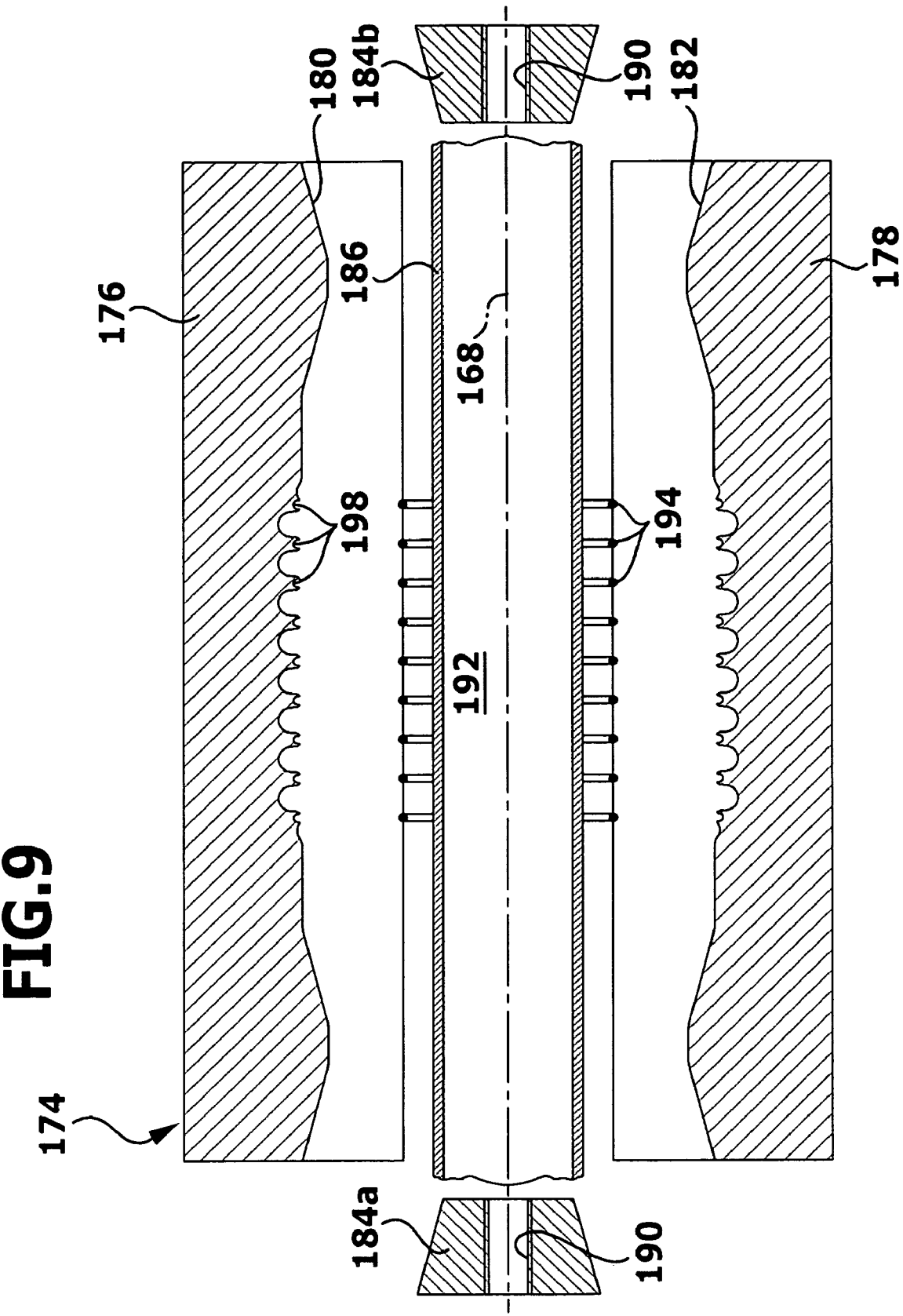
FIG. 9 shows a schematic longitudinal section through a two-part blow mould with an inserted plastics material tube and inserted reinforcement rings prior to a blow moulding process, the blow mould being open.
Figure 10:
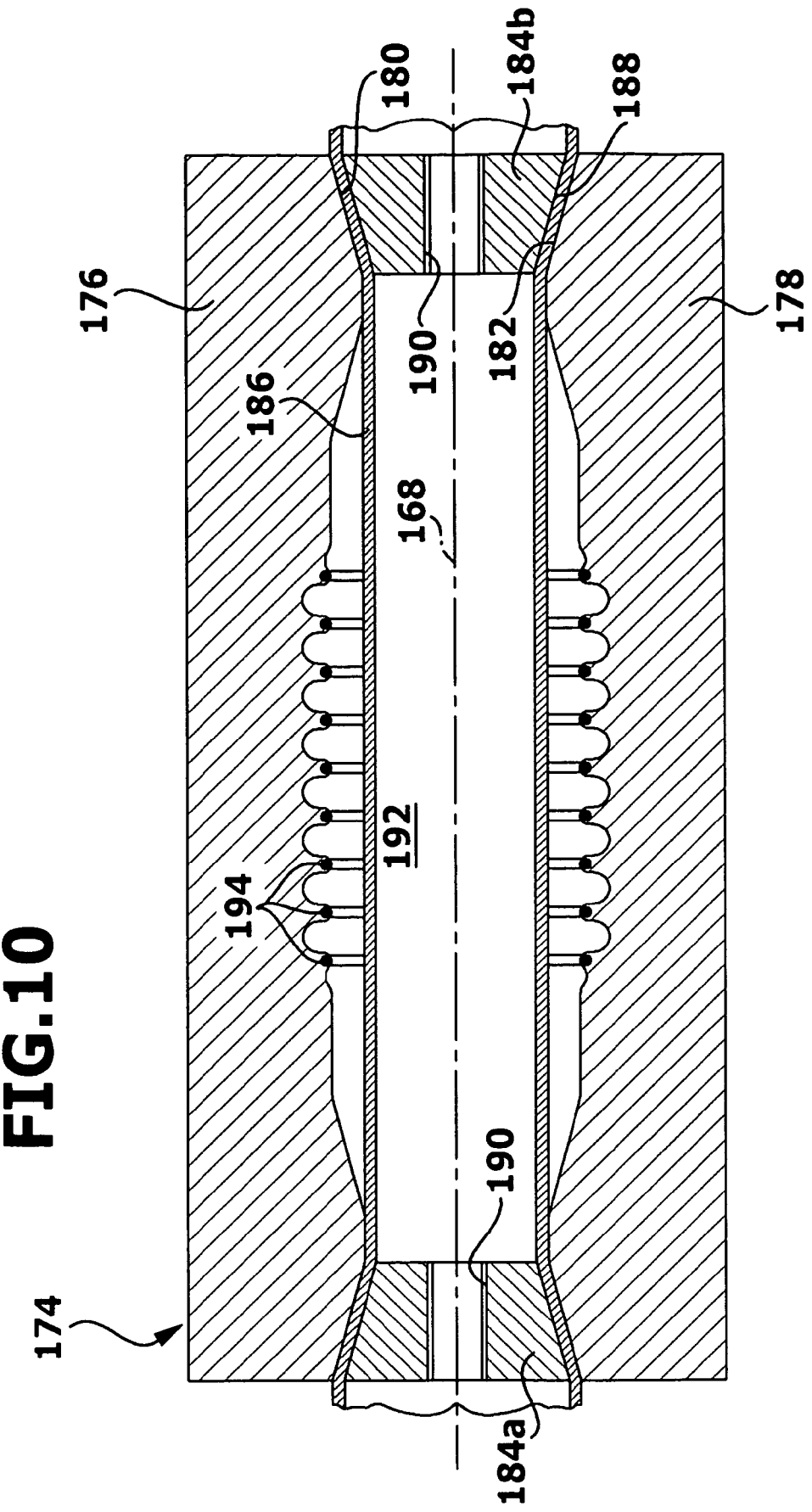
FIG. 10 shows a schematic longitudinal section through the blow mould of FIG. 9 with the inserted plastics material tube and the inserted reinforcement rings prior to the blow moulding process, the blow mould being closed.
Figure 11:
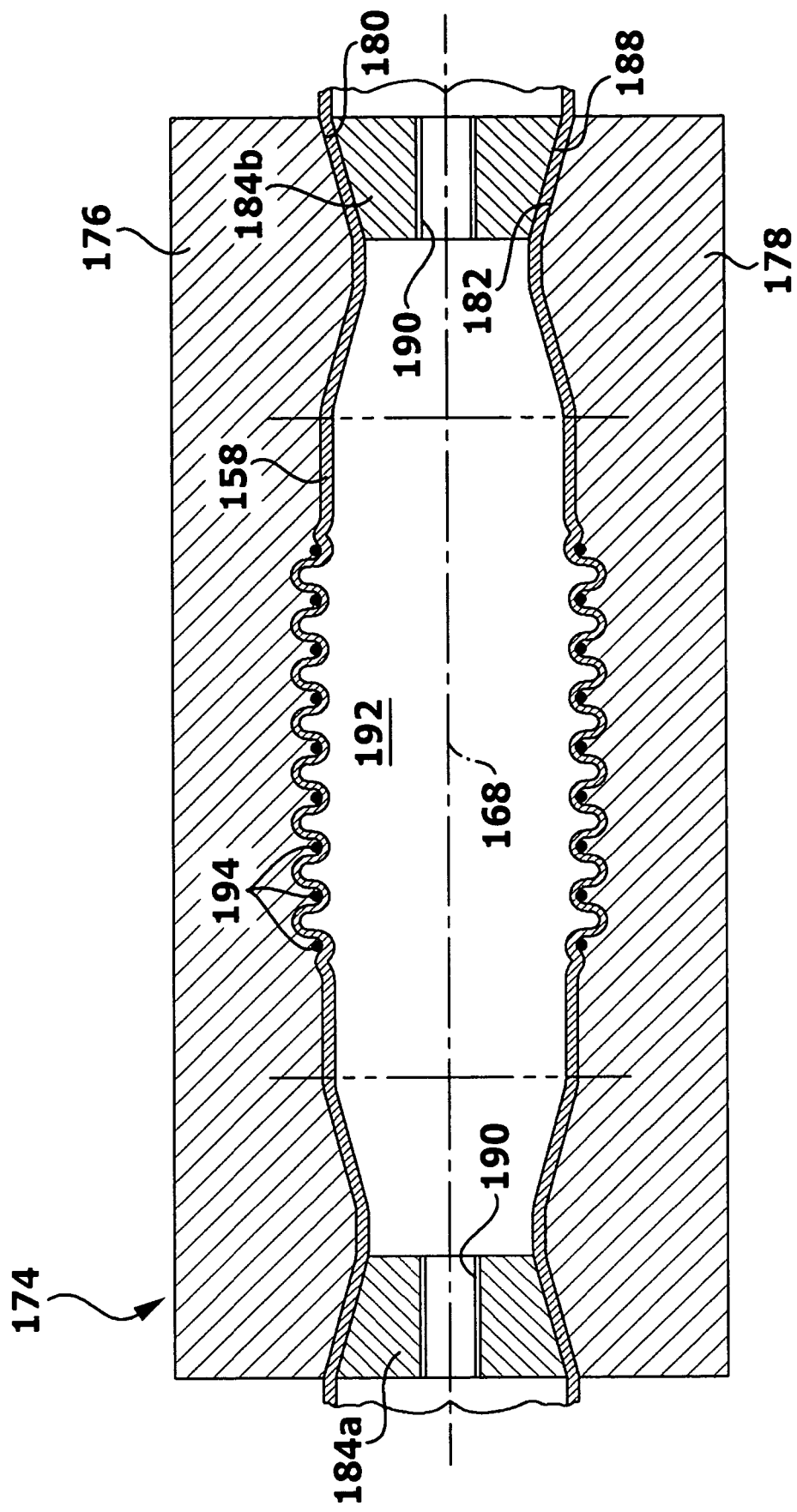
FIG. 11 shows a schematic longitudinal section through the blow mould of FIGS. 9 and 10 with the moulded plastics material tube and the reinforcement rings arranged thereon after completion of the blow moulding process.

One-piece reinforcement rings 194 may be joined to the plastics material tube 158 while the plastics material tube 158 is being moulded, as shown in FIGS. 9 to 11.

For this purpose, as may be seen from FIG. 9, when the multiple-part blow mould 174 is open, the reinforcement rings 194 are introduced together with the hose 186 of the starting material in the desired axial position between the upper part 176 and the lower part 178 of the blow mould 174, the hose 186 of the starting material extending through the reinforcement rings 194.

The blow mould 174 is then closed (see FIG. 10), the reinforcement rings 194 being accommodated in annular grooves 198 provided for this purpose in the insides 180, 182 of the upper part 176 and respectively the lower part 178 of the blow mould 174, such that during the blow moulding process, the reinforcement rings 194 retain their desired orientation relative to the longitudinal axis 168 of the tube and do not tilt.

After the blow mould 174 has been closed and heated to the blowing temperature, the blow moulding process is carried out, as in the first embodiment, by charging the interior 192 of the hose 186 with air under the blowing pressure or inert gas, as a result of which the plastics material tube 158 is formed into the desired contour (see FIG. 11).

The reinforcement rings 194 are now joined in a positive manner with the plastics material tube 158, such that the plastics material tube 158 may be handled and assembled with the reinforcement rings 194 as a unit.

When the blow mould 174 has cooled to the temperature for removal from the mould, it is opened and the plastics material tube 158 is removed with the reinforcement rings 194 arranged thereon.

Otherwise, the second embodiment shown in FIGS. 7 to 11 of a plastics material tube 158 serving as a hot-side charge-air line 132 coincides with the first embodiment shown in FIGS. 1 to 6 in respect of construction, function and method of production, reference being made to the above description of the first embodiment in this regard.

Figure 12:
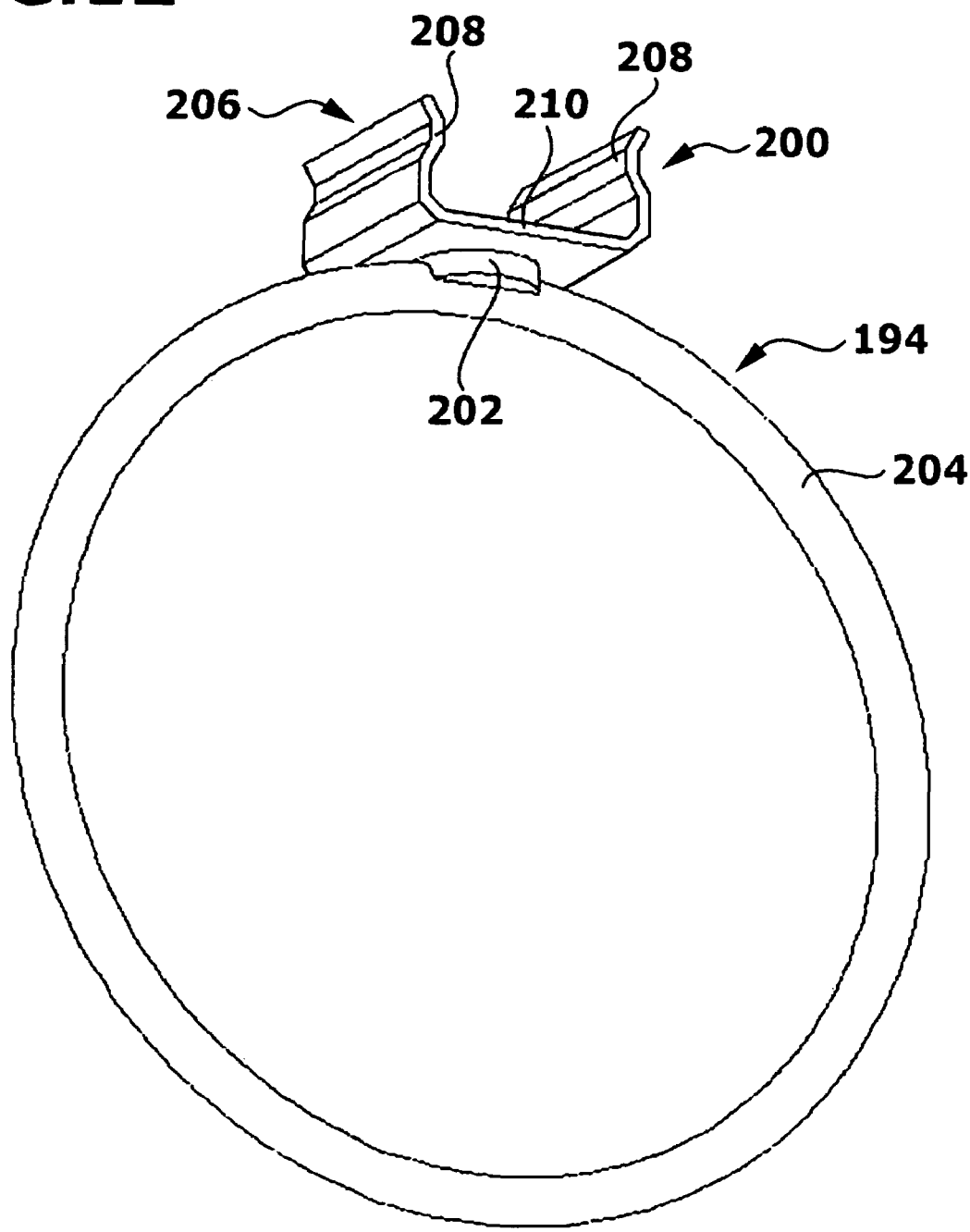
FIG. 12 is a schematic perspective illustration of a reinforcement ring with a rotationally symmetrical basic body which is provided with an attachment element.

A third embodiment of a one-piece plastics material tube which serves as a hot-side charge-air line and of which one reinforcement ring 194 is shown in FIG. 12, differs from the second embodiment shown in FIGS. 7 and 8 in that at least one of the reinforcement rings 194 is provided with at least one attachment element 200 used for attaching the plastics material tube 158 to an attachment point located outside the charge-air line 132, for example to a part of the bodywork or to a part of the internal combustion engine 100.

The attachment element 200 comprises a base 202 which is, for example substantially cylindrical and has a receiving groove for receiving part of an annular basic body 204 of the reinforcement ring 194.

The base 202 is used for fixing the attachment element 200 to the basic body 204.

In particular, it may be provided that the base 202 is fixed on the basic body 204 by welding, in particular by spot welding.

Furthermore, the attachment element 200 comprises a snap-fit part 206 which has a substantially U-shaped cross section and comprises two snap-fit tongues 208 and a web 210 joining the two snap-fit tongues 208 together.

The resilient snap-fit tongues 208 are provided to engage behind a respective projection on the attachment point located outside the charge-air line 132 and, by snapping in behind these projections, to fix in a detachable manner the reinforcement ring 194 and thus the plastics material tube 158, on which the reinforcement ring 194 is arranged, on the attachment point.

As an alternative to the configuration as a snap-fit element, the attachment element 200 may also be configured as a clamping element, a locking element, a threaded pin or a nut.

Otherwise, the third embodiment shown in FIG. 12 of a plastics material tube serving as a hot-side charge-air line coincides with the second embodiment shown in FIGS. 7 to 11 in respect of construction, function and method of production, reference being made to the above description of the second embodiment in this regard.

Figure 13:
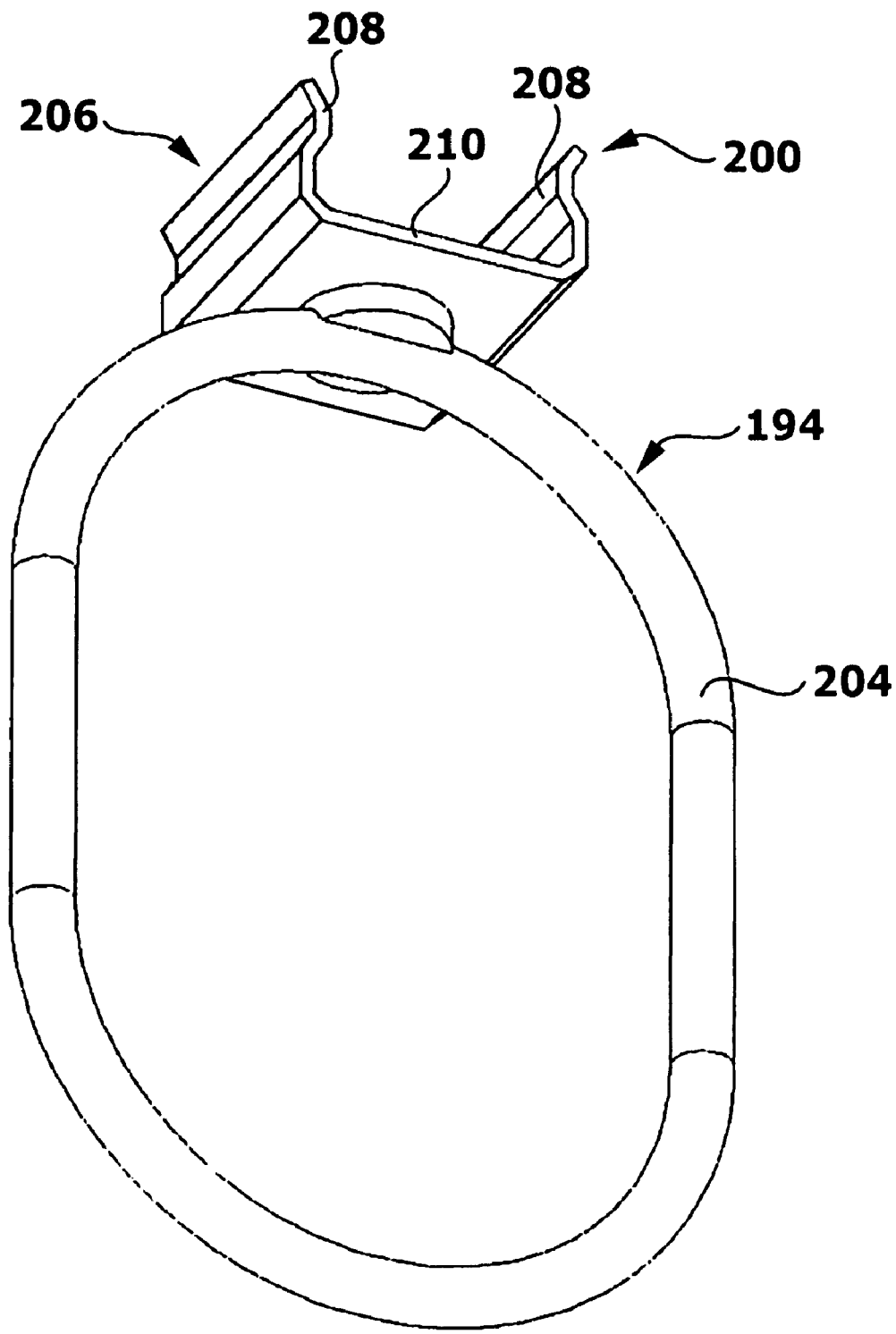
FIG. 13 is a schematic perspective illustration of a reinforcement ring with an oval basic body which is provided with an attachment element.

A fourth embodiment of a plastics material tube which serves as a hot-side charge-air line and of which one reinforcement ring 194 is shown in FIG. 13 differs from the third embodiment shown in FIG. 12 in that the at least one reinforcement ring 194 provided with the attachment element 200 has a basic body 204 which is not substantially rotationally symmetrical, as is the case in the third embodiment, but instead has a non-rotationally symmetrical shape, in particular an oval shape.

Consequently, it is possible for this reinforcement ring 194 to be arranged on a portion of the plastics material tube 158 which has a non-rotationally symmetrical cross section, in particular an oval cross section.

Otherwise, the fourth embodiment shown in FIG. 13 of a plastics material tube serving as a hot-side charge-air line coincides with the third embodiment shown in FIG. 12 in respect of construction, function and method of production, reference being made to the above description of the third embodiment in this regard.

The invention claimed is:

1. Assembly comprising an exhaust gas turbocharger and an intercooler for an internal combustion engine and a hot-side charge-air line connecting the exhaust gas turbocharger to a charge-air inlet of the intercooler, wherein the hot-side charge-air line comprises a one-piece plastics material tube which is formed from a material containing polytetrafluoroethylene and/or modified polytetrafluoroethylene and has at least one flexible zone, and
   wherein the plastics material tube is blow molded and at least one reinforcement ring is arranged on the plastics material tube.

2. Assembly according to claim 1, wherein the flexible zone comprises a bellows arrangement.

3. Assembly according to claim 1, wherein the flexible zone is arranged closer to the end on the intercooler side of the plastics material tube than the end on the turbocharger side of the plastics material tube.

4. Assembly according to claim 1, wherein the plastics material tube has at least one rigid zone.

5. Assembly according to claim 4, wherein the rigid zone has at least one curved portion.

6. Assembly according to claim 1, wherein the plastics material tube is moulded at a temperature above the crystallite melting temperature of the starting material.

7. Assembly according to claim 1, wherein the plastics material tube is formed from a polytetrafluoroethylene compound and/or a modified polytetrafluoroethylene compound.

8. Assembly according to claim 7, wherein the polytetrafluoroethylene compound and/or the modified polytetrafluoroethylene compound contains a black pigment, preferably carbon black.

9. Assembly according to claim 1, wherein the hot-side charge-air line does not comprise any other element conveying charge-air apart from the one-piece plastics material tube.

10. Assembly according to claim 1, wherein at least one reinforcement ring is arranged on the outside of the plastics material tube.

11. Assembly according to claim 1, wherein at least one reinforcement ring is arranged in the flexible zone of the plastics material tube.

12. Assembly according to claim 1, wherein at least one reinforcement ring is held in a positive manner on the plastics material tube.

13. Assembly according to claim 1, wherein at least one reinforcement ring is formed in one piece.

14. Assembly according to claim 1, wherein at least one reinforcement ring is joined to the plastics material tube when the plastics material tube is being moulded.

15. Assembly according to claim 1, wherein at least one reinforcement ring comprises a metallic material, in particular a steel material.

16. Assembly according to claim 1, wherein at least one reinforcement ring comprises a plastics material.

17. Assembly according to claim 1, wherein at least one reinforcement ring is formed from a fibrous material.

18. Assembly according to claim 17, wherein the fibrous material comprises organic, mineral and/or metallic fibres.

19. Assembly according to claim 17, wherein the at least one reinforcement ring is braided, woven and/or spun from the fibrous material.

20. Assembly according to claim 1, wherein at least one reinforcement ring is provided with an attachment element for securing the plastics material tube to an attachment point located outside the charge-air line.

21. Assembly according to claim 20, wherein the attachment element comprises a snapfit element, a clamping element, a locking element, a threaded pin and/or a nut.

22. Assembly according to claim 1, wherein at least one reinforcement ring has a non-rotationally symmetrical basic body.

23. Assembly according to claim 1, wherein the plastics material tube is thermally stable at an operating temperature of at least 200° C., preferably at least 250° C.

24. Assembly according to claim 1, wherein the plastics material tube is mechanically stable at an internal operating pressure of at least 2 bar, preferably at least 2.5 bar.

* * * * *

UNITED STATES PATENT AND TRADEMARK OFFICE
CERTIFICATE OF CORRECTION

PATENT NO. : 7,699,036 B2  Page 1 of 1
APPLICATION NO. : 12/070972
DATED : April 20, 2010
INVENTOR(S) : Stefan Bock et al.

It is certified that error appears in the above-identified patent and that said Letters Patent is hereby corrected as shown below:

Title page, item [73] Assignees: replace with --ElringKlinger AG, Dettingen (DE); Veritas AG, Gelnhausen (DE)--.

Column 10, Claim 21, replace --snapfit-- with --snap-fit--.

Column 10, Claim 23, remove --.-- between "C" and ",".

Signed and Sealed this

Twenty-second Day of June, 2010

David J. Kappos
*Director of the United States Patent and Trademark Office*